United States Patent [19]
Kelley et al.

[11] Patent Number: 5,639,115
[45] Date of Patent: Jun. 17, 1997

[54] DEPLOYMENT DOOR ASSEMBLY FOR AN INFLATABLE VEHICLE OCCUPANT RESTRAINT

[75] Inventors: Scott A. Kelley, Algonac; Ashir P. Thakore, Novi; John L. Miklas, Clinton Township; Daniel C. Bach, Jr., Belleville; Edgar Valdez, Beverly Hills, all of Mich.

[73] Assignees: TRW Vehicle Safety Systems Inc., Lyndhurst, Ohio; Ford Motor Comany, Dearborn, Mich.

[21] Appl. No.: 570,778

[22] Filed: Dec. 12, 1995

[51] Int. Cl.$^6$ .................................................. B60R 21/16
[52] U.S. Cl. ........................................ 280/728.3; 280/732
[58] Field of Search .......................... 280/728.2, 728.3, 280/731, 732

[56] References Cited

U.S. PATENT DOCUMENTS

| | | | |
|---|---|---|---|
| 5,082,310 | 1/1992 | Bauer | 280/732 |
| 5,154,444 | 10/1992 | Nelson | 280/732 |
| 5,217,250 | 6/1993 | Sakata | 280/728.3 |
| 5,344,183 | 9/1994 | Hersman et al. | 280/728.3 |
| 5,368,327 | 11/1994 | Shiraki et al. | 280/728.2 |
| 5,378,014 | 1/1995 | Cooper | 280/728.3 |
| 5,393,089 | 2/1995 | Pakulsky et al. | 280/728.3 |
| 5,427,408 | 6/1995 | Ando et al. | 280/728.3 |

FOREIGN PATENT DOCUMENTS 2267064  11/1993  United Kingdom.

*Primary Examiner*—Kenneth R. Rice
*Attorney, Agent, or Firm*—Tarolli, Sundheim, Covell, Tummino & Szabo

[57] ABSTRACT

A trim piece (40) for use with an inflatable vehicle occupant restraint (14) includes a deployment panel (42), a base (46), and a scrim (76). The deployment panel (42) covers the restraint (14) in the vehicle, and includes a deployment door (44), a hinge (102), and a door frame section (90) which surrounds the hinge (102) and the deployment door (44). The base (46) also surrounds the hinge (102) and the deployment door (44), and projects inward from the door frame section (90) to define a chute (48) through which the restraint (14) moves outward toward the deployment door (44). The scrim (76) is embedded in the deployment panel (42) and the base (46). The scrim (76) extends partially across the door frame section (90) toward the deployment door (44), extends inward from the door frame section (90) into the base (46), turns approximately 180° within the base (46), extends back outward toward the deployment panel (42), and extends further from the base (46) to the deployment door (44) through the hinge (102).

14 Claims, 3 Drawing Sheets

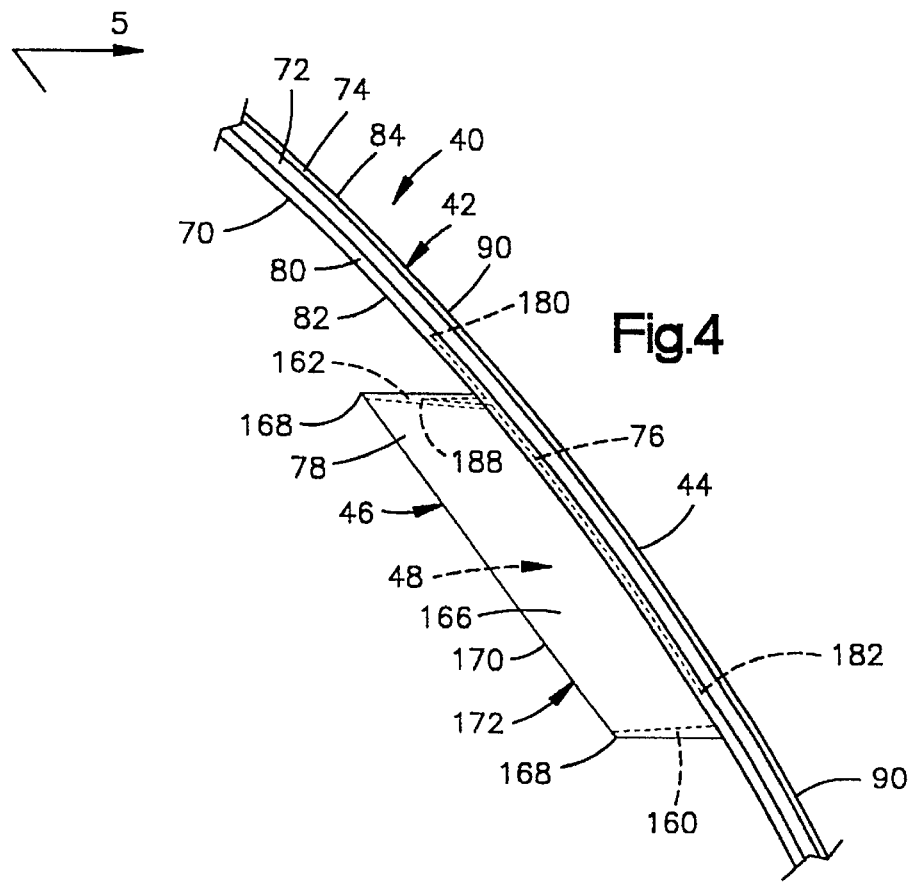

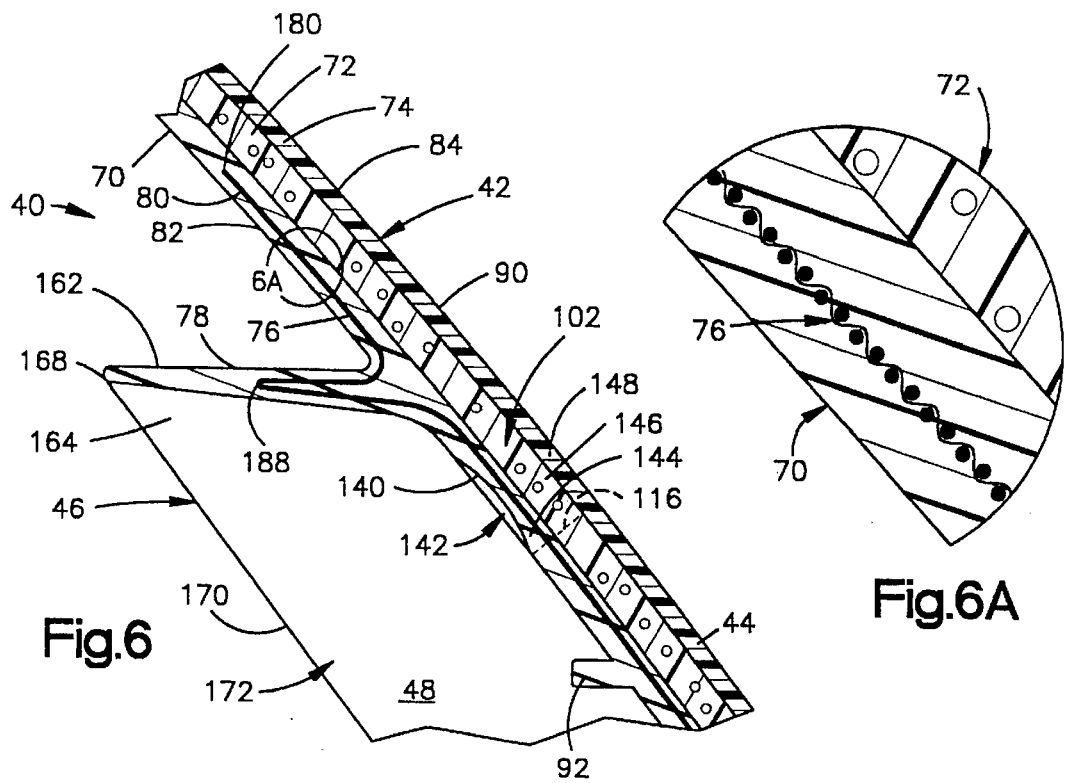
Fig.6
Fig.6A
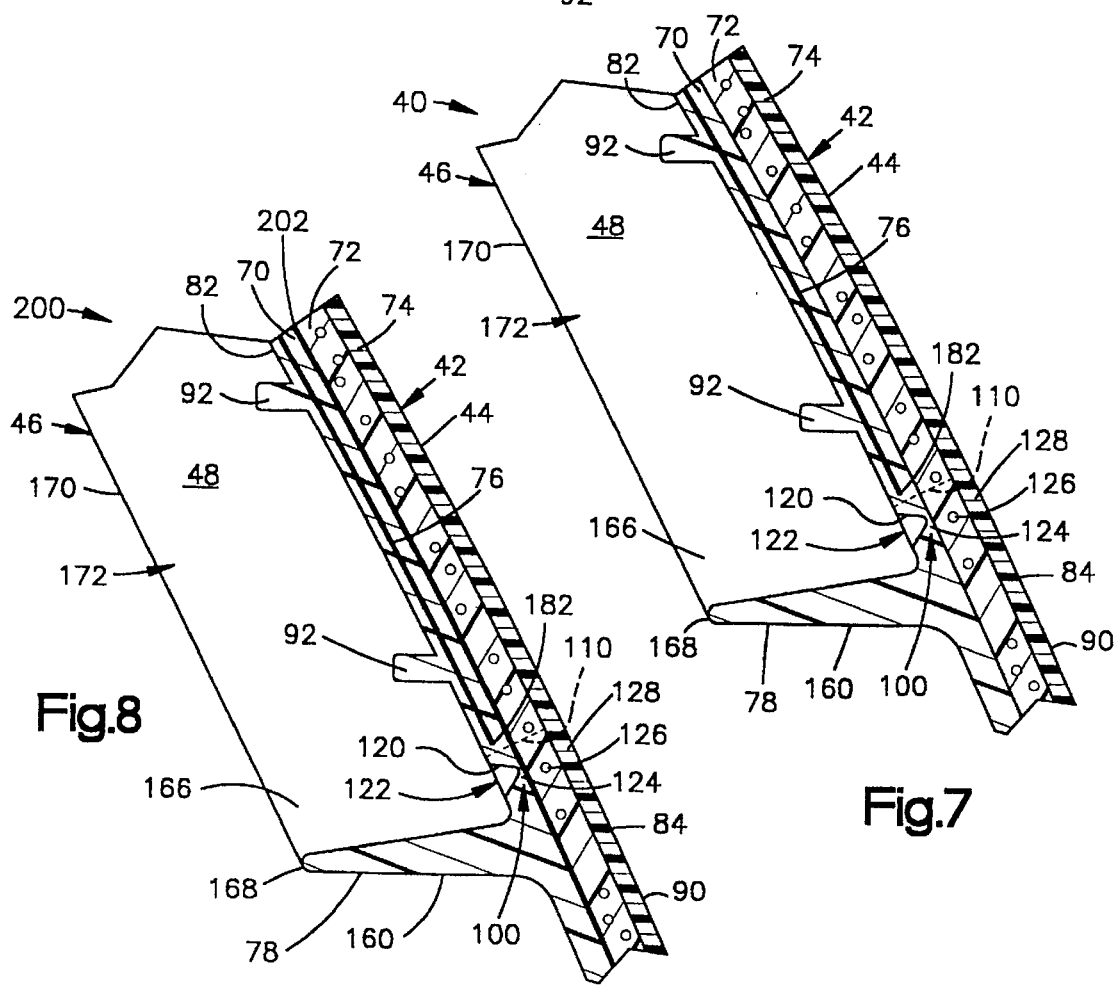
Fig.8
Fig.7

DEPLOYMENT DOOR ASSEMBLY FOR AN INFLATABLE VEHICLE OCCUPANT RESTRAINT

FIELD OF THE INVENTION

The present invention relates to an inflatable vehicle occupant restraint, and particularly relates to a deployment door which is opened upon inflation of the restraint.

BACKGROUND OF THE INVENTION

A particular type of inflatable vehicle occupant restraint is commonly referred to as an air bag. An air bag is stored in a vehicle in an uninflated condition. When the vehicle experiences a collision-indicating condition of at least a predetermined threshold level, inflation fluid is directed to flow from a source of inflation fluid into the air bag. The inflation fluid inflates the air bag to an inflated condition in which the air bag extends into the vehicle occupant compartment. When the air bag is inflated into the vehicle occupant compartment, it restrains movement of a vehicle occupant to help protect the occupant from forcefully striking parts of the vehicle as a result of the collision.

The air bag is typically mounted in the vehicle as a part of an air bag module. In addition to the air bag, the module includes an inflator and a reaction canister. The inflator comprises the source of inflation fluid for inflating the air bag. The reaction canister contains the air bag and the inflator, and has a deployment opening through which the air bag emerges from the reaction canister when it is being inflated.

A deployment door extends over the deployment opening in the reaction canister to conceal the air bag and the other parts of the module from the vehicle occupant compartment. The deployment door may be a part of the module. Alternatively, the deployment door may be a part of a trim panel on the vehicle structure in which the module is mounted. For example, the deployment door may be a part of a trim panel on the vehicle instrument panel.

When the inflator is actuated, the reaction canister directs the inflation fluid to flow from the inflator into the air bag. As the inflation fluid enters the air bag, it moves the air bag outward from the reaction canister through the deployment opening and forcefully against the deployment door. A closure portion of the deployment door is ruptured by the force of the fluid pressure in the air bag. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag is inflated outward from the reaction canister through the deployment opening and into the vehicle occupant compartment.

SUMMARY OF THE INVENTION

The present invention relates to a vehicle trim piece which includes a deployment door assembly for use with an inflatable vehicle occupant restraint. In accordance with the present invention, the deployment door assembly comprises panel means, base means, and a scrim.

The panel means covers the restraint in the vehicle. The panel means includes a deployment door and hinge means for guiding pivotal movement of the deployment door. A door frame section of the panel means surrounds the hinge means and the deployment door.

The base means comprises a wall structure which also surrounds the hinge means and the deployment door. The wall structure projects inward from the door frame section of the panel means, and defines a chute through which the restraint moves outward toward the deployment door when the restraint is being inflated.

The scrim is embedded in the panel means and the base means. The scrim extends partially across the door frame section of the panel means to the deployment door, and extends inward from the door frame section into the wall structure. The scrim turns approximately 180° within the wall structure, extends back outward toward the panel means, and extends further from the wall structure to the deployment door through the hinge means.

In a first embodiment of the present invention, the scrim has a woven structure. The panel means has layers including a substrate layer, an intermediate layer, and a cover layer. The substrate layer and the cover layer have substantially incompressible structures, and extend across the deployment door so as to define inner and outer sides of the deployment door, respectively. The intermediate layer has a compressible structure, and extends across the deployment door between the substrate layer and the cover layer. The wall structure and the substrate layer are contiguous portions of a single, continuous piece of substrate material in which the scrim is embedded.

In a second embodiment of the present invention, the panel means has an additional intermediate layer located between the substrate layer and the compressible intermediate layer. The additional intermediate layer has a woven structure.

BRIEF DESCRIPTION OF THE DRAWINGS

Further features of the present invention will become apparent to those skilled in the art to which the present invention relates from reading the following description with reference to the accompanying drawings, in which:

FIG. 4 is a view taken on line 4—4 of FIG. 3;

FIG. 5 is a view taken on line 5—5 of FIG. 4;

FIG. 6 is an enlarged, partial sectional view of the part shown in FIG. 4;

FIG. 6A is an enlargement of a portion of FIG. 6;

FIG. 7 also is an enlarged, partial sectional view of the part shown in FIG. 4; and FIG. 8 is a view similar to FIG. 7 showing a part of a vehicle occupant restraint apparatus comprising a second embodiment of the present invention.

DESCRIPTION OF PREFERRED EMBODIMENT

Figure 1:
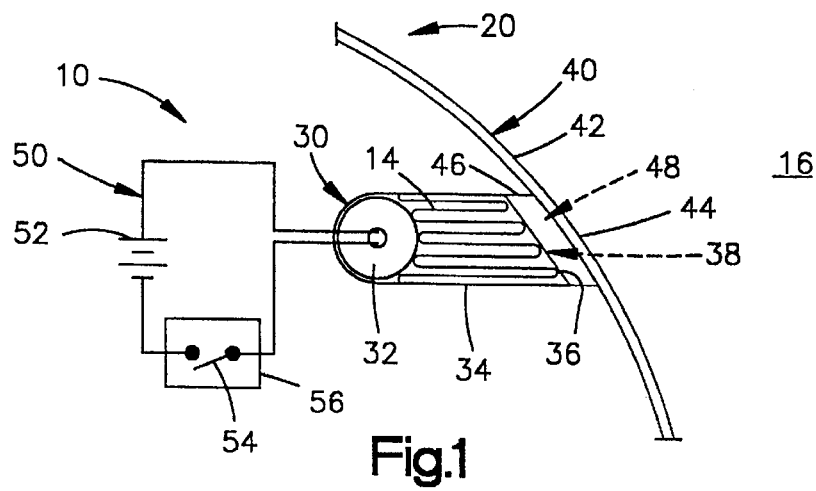
FIG. 1 is a schematic view of a vehicle occupant restraint apparatus comprising a first embodiment of the present invention.
Figure 2:
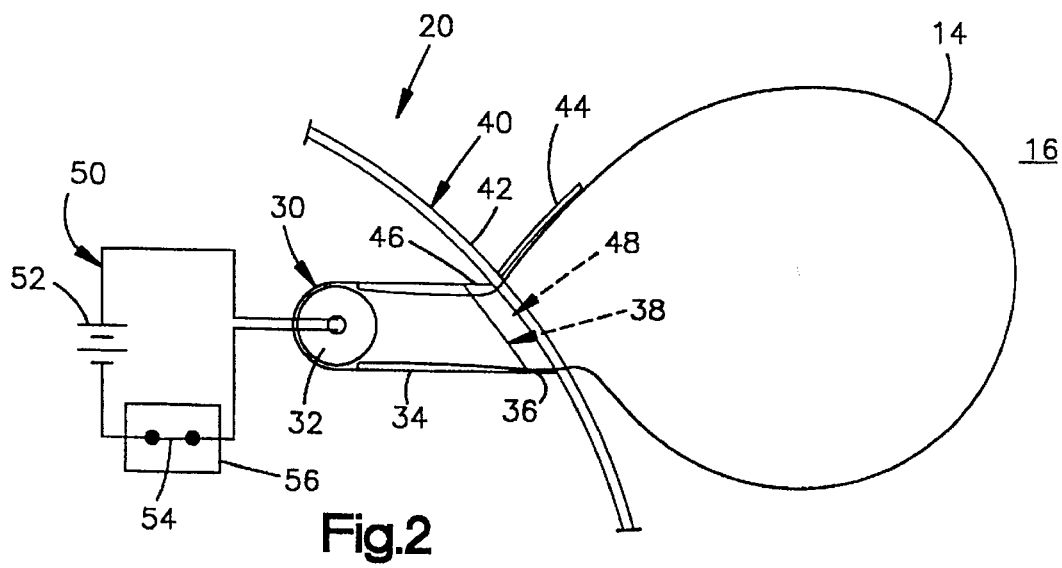
FIG. 2 is a schematic view showing the apparatus of FIG. 1 in an actuated condition.
Figure 3:
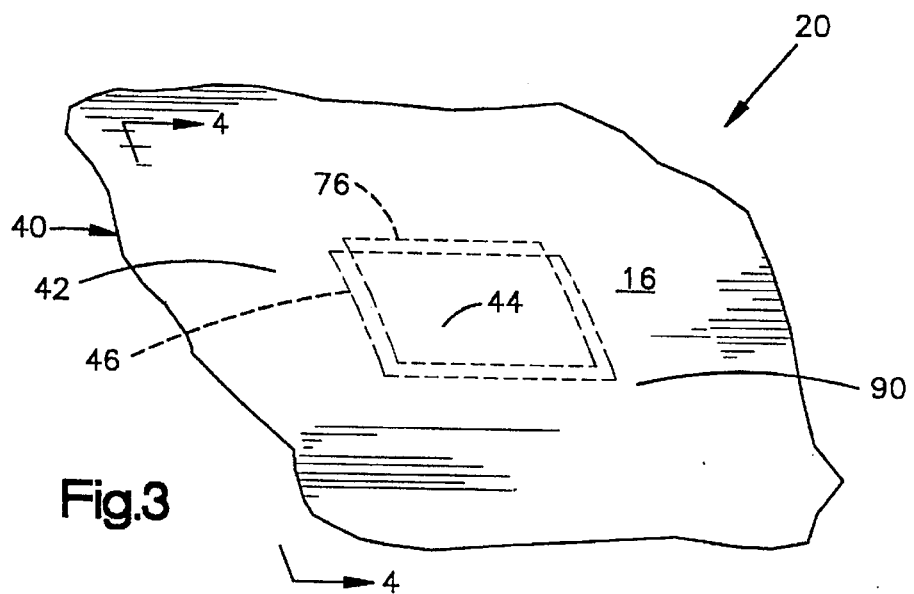
FIG. 3 is a perspective view of parts shown in FIG. 1.

A vehicle occupant restraint apparatus 10 comprising a first embodiment of the present invention is shown schematically in FIGS. 1 and 2. The apparatus 10 includes a particular type of inflatable vehicle occupant restraint 14 which is commonly referred to as an air bag. The air bag 14 is inflatable from an uninflated condition, as shown in FIG. 1, to an inflated condition, as shown in FIG. 2.

When the air bag 14 is being inflated, it moves into the vehicle occupant compartment 16 at a location adjacent to a part 20 of the vehicle in which the air bag 14 is mounted. In the preferred embodiments of the present invention shown in the drawings, that part 20 of the vehicle is the instrument panel. The air bag 14 then restrains movement of a vehicle occupant toward the instrument panel 20 to help protect the occupant from a forceful impact with the instrument panel 20 or other parts of the vehicle.

The air bag 14 is part of an air bag module 30 which is mounted in the instrument panel 20. In addition to the air bag 14, the module 30 includes an inflator 32 and a reaction canister 34. The air bag 14 and the inflator 32 are contained in the reaction canister 34, and are fixed to the reaction canister 34 in a known manner. The reaction canister 34 is mounted in the instrument panel 20 in a known manner. An outer end 36 of the reaction canister 34 is open so as to define a deployment opening 38 through which the air bag 14 emerges from the reaction canister 34 when the air bag 14 is being inflated. Although the reaction canister 34 is shown as a separate structure which is mounted in the instrument panel 20, such a canister could alternatively be defined by the structure of the instrument panel 20, or by another part of the vehicle from which the air bag 14 is to be inflated into the vehicle occupant compartment 16.

The instrument panel 20 has a trim piece 40. A panel portion 42 of the trim piece 40 is a deployment panel which extends across the location of the air bag module 30 so as to conceal the module 30 from the vehicle occupant compartment 16. The deployment panel 42 includes a deployment door 44 which is pivotal from a closed position, as shown in FIG. 1, to an opened position, as shown in FIG. 2. A base 46 of the trim piece 40 extends inward from the deployment panel 42 to the reaction canister 34. The base 46 defines a chute 48 through which the inflating air bag 14 moves from the deployment opening 38 to the deployment door 44.

The inflator 32 comprises a source of inflation fluid for inflating the air bag 14. As known in the art, the inflator 32 may contain an ignitable gas generating material which, when ignited, rapidly generates a large volume of gas. The inflator 32 may alternatively contain a stored quantity of pressurized inflation fluid, or a combination of pressurized inflation fluid and ignitable material for heating the inflation fluid.

The inflator 32 is included in an electrical circuit 50. The electrical circuit 50 further includes a power source 52, which is preferably the vehicle battery and/or a capacitor, and a normally open switch 54. The switch 54 is part of a sensor 56 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 14 is desired to protect an occupant of the vehicle. The sensor 56 then closes the switch 54, and the inflator 32 is actuated electrically.

When the inflator 32 is actuated, it emits a large volume of inflation fluid into the reaction canister 34. The reaction canister 34 directs the inflation fluid from the inflator 32 into the air bag 14 to inflate the air bag 14. As the inflation fluid begins to inflate the air bag 14, it moves the air bag 14 rapidly outward through the chute 48 and forcefully against the deployment door 44. The air bag 14 then pivots the deployment door 44 outward from the closed position to the opened position. As the inflation fluid continues to inflate the air bag 14, it moves the air bag 14 outward into the vehicle occupant compartment 16 past the deployment door 44.

As shown in FIG. 4, the trim piece 40 has several molded plastic parts that are joined together. The molded plastic parts of the trim piece 40 include a substrate 70, an intermediate layer 72, and a cover layer 74. The trim piece 40 further includes a scrim 76 which is embedded in the substrate 70.

The substrate 70 is defined by a continuous piece of molded plastic material with a substantially incompressible structure. The plastic material of which the substrate 70 is formed may have any suitable composition known in the art. A base portion 78 of the substrate 70 defines the base 46 of the trim piece 40. A panel portion 80 of the substrate 70 defines an inner side surface 82 of the deployment panel 42.

The intermediate layer 72 is defined by a continuous piece of molded plastic material which also may have any suitable composition known in the art. However, the plastic material of which the intermediate layer 72 is formed has a compressible structure. As shown in FIG. 6, the compressible structure of the intermediate layer 72 preferably is a foam structure. The intermediate layer 72 provides the trim piece 40 with a compressible feel.

The cover layer 74 defines an outer side surface 84 of the trim piece 40 which faces into the vehicle occupant compartment 16. Like the substrate 70, the cover layer 74 is defined by a continuous piece of molded plastic material with a substantially incompressible structure. The plastic material of which the cover layer 74 is formed may have any suitable composition known in the art.

As best shown in FIG. 5, the deployment door 44 in the preferred embodiments of the present invention has a generally rectangular peripheral shape, and is fully surrounded by an adjoining door frame section 90 of the deployment panel 42. A plurality of reinforcing ribs 92 project inward from the inner side surface 82 of the deployment panel 42 at the inner side of the deployment door 44.

The boundaries of the deployment door 44 are defined by a stress riser 100 and a hinge 102 which together extend around the perimeter of the deployment door 44. The stress riser 100 has first and second opposite ends 104 and 106, and extends between the opposite ends 104 and 106 in a U-shaped configuration extending along three sides of the deployment door 44. The stress riser 100 thus defines one long side 110 and two short sides 112 and 114 of the deployment door 44. The hinge 102 extends in a straight line between the opposite ends 104 and 106 of the stress riser 100. The hinge 102 thus defines another long side 116 of the deployment door 44.

The stress riser 100 is defined in part by the panel portion 80 of the substrate 70, and in part by the overlying layers 72 and 74. As best shown in FIG. 7, a recessed surface 120 of the substrate 70 defines a notch 122 in the deployment panel 42. The notch 122 extends along the length of the stress riser 100, and has a depth extending from the inner side surface 82 of the deployment panel 42 toward the intermediate layer 72 of the deployment panel 42. An inner portion 124 of the stress riser 100 is defined by the relatively thin plastic material of the substrate 70 which is located between the recessed surface 120 and the intermediate layer 72. An intermediate portion 126 of the stress riser 100 is defined by the plastic material of the intermediate layer 72 which overlies the inner portion 124 of the stress riser 100. An outer portion 128 of the stress riser 100 is likewise defined by the plastic material of the cover layer 74 which overlies the intermediate portion 126 of the stress riser 100. Importantly, the contour of the outer side surface 84 of the deployment panel 42 is not affected by the structure of the stress riser 100. As a result, the outer side surface 84 extends fully across and around the deployment door 44 without interruption at the stress riser 100 so that the outline of the deployment door 44 is not visible from the vehicle occupant compartment 16.

The hinge 102 is somewhat similar to the stress riser 100 in that the hinge 102 is defined in part by the substrate 70, in part by the intermediate layer 72, and in part by the cover layer 74. As best shown in FIG. 6, a recessed surface 140 of the substrate 70 defines a shallow groove 142. The groove 142 extends along the length of the hinge 102 between the opposite ends 104 and 106 (FIG. 5) of the stress riser 100. The width of the hinge 102 is approximately equal to the width of the groove 142. An inner portion 144 of the hinge 102 is defined by the relatively thin plastic material of the substrate 70 which is located between the recessed surface 140 and the intermediate layer 72. An intermediate portion 146 of the hinge 102 is defined by the overlying plastic material of the intermediate layer 72, and an outer portion 148 of the hinge 102 is likewise defined by the overlying plastic material of the cover layer 74.

The thickness of the hinge 102 is somewhat less than the thickness of the adjacent portions of the deployment panel 42 on opposite sides of the groove 142. This promotes bending at the hinge 102 when the inflating air bag 14 opens the deployment door 44, as described fully below. However, the hinge 102 is both wider and thicker than the stress riser 100 (FIG. 7). This helps to ensure that the force of the inflating air bag 14 ruptures the deployment panel 42 at the stress riser 100 rather than at the hinge 102. Such rupturing also is described fully below. Like the stress riser 100, the hinge 102 does not affect the contour of the outer side surface 84 of the deployment panel 42.

The base 46 projects inward from the door frame section 90 of the deployment panel 42. The base 46 is a wall structure with a rectangular shape defined by a pair of parallel side walls 160 and 162 and a pair of parallel end walls 164 and 166. One side wall 160 extends closely alongside the stress riser 100 adjacent to the first long side 110 of the deployment door 44. The other side wall 162 extends closely alongside the hinge 102 adjacent to the second long side 116 of the deployment door 44. The end walls 164 and 166 extend closely alongside the stress riser 100 at the short sides 112 and 114, respectively, of the deployment door 44. Moreover, the base walls 160, 162, 164 and 166 intersect and are joined to each other so as to define four closed corners 168 of the base 46. Accordingly, the base 46 closely surrounds the deployment door 44, the stress riser 100, and the hinge 102.

A lower edge surface 170 of the base 46 defines an opening 172 which extends fully across the base 46. The opening 172 defines an inner end of the chute 48. The size and shape of the opening 172 at the inner end of the chute 48 are approximately equal to the size and shape of the deployment opening 38 at the outer end 36 of the reaction canister 30 (FIG. 1). The base 46 could be fastened to the reaction canister 34 and/or to an adjacent supporting part (not shown) of the instrument panel 20 by any suitable fastening structure known in the art.

As noted above, the scrim 76 is embedded in the substrate 70. The scrim 76 preferably has a woven structure (FIG. 6A), and may be formed of woven strands of metal, plastic, or fibers of any other suitable materials known in the art. The scrim 76 most preferably comprises woven strands of a material having tensile and shear strengths that are greater than the tensile and shear strengths of the plastic materials of the other parts 70, 72, and 74 of the trim piece 40 described above.

As shown in FIGS. 4 and 5, the scrim 76 has a rectangular peripheral shape with opposite side edges 180 and 182 and opposite end edges 184 and 186. The scrim 76 extends partially across the deployment panel 42 from the door frame section 90 to the deployment door 44. As shown in greater detail in the cross-sectional view of FIG. 6, the scrim 76 extends partially across the door frame section 90 toward the deployment door 44, and extends inward from the door frame section 90 into the base 46. Specifically, the scrim 76 turns from the door frame section 90 into the side wall 162 of the base 46 which is located adjacent to the hinge 102 and the corresponding long side 116 of the deployment door 44. The scrim 76 has a folded inner edge 188 at which it turns approximately 180° within the side wall 162. The scrim 76 extends back outward through the side wall 162 from the folded inner edge 188 toward the deployment panel 42, and continues across the deployment panel 42 to the deployment door 44 through the hinge 102.

As shown in FIGS. 5 and 7, the scrim 76 extends nearly entirely across the deployment door 44, with the second side edge 182 of the scrim 76 being located beside the stress riser 100 at the first long side 110 of the deployment door 44. The opposite end edges 184 and 186 (FIG. 5) of the scrim 76 extend alongside the stress riser 100 adjacent to the two short sides 112 and 114 of the deployment door 44, respectively. The scrim 76 thus extends across and through the base wall 162, the hinge 102, and the deployment door 44 to reinforce those parts of the trim piece 40, but stops short of the stress riser 100 so as not to interfere with rupturing of the deployment panel 42 at the stress riser 100.

When the air bag 14 is inflated upon the occurrence of a vehicle collision, as described above with reference to FIGS. 1 and 2, the base 46 directs the air bag 14 to move outward through the chute 48 from the deployment opening 38 toward the deployment door 44. As the air bag 14 is inflated and expanded outward through the chute 48, the surrounding walls 160–166 of the base 46 constrain the air bag 14 to remain substantially within the perimeter of the deployment door 44. When the air bag 14 moves against the ribs 92 and the inner side surface 82 at the deployment door 44, the inflation fluid in the air bag 14 causes it to apply a fluid pressure force to the deployment panel 42. This induces stress in the stress riser 100. When the stress reaches a predetermined elevated level, the stress riser 100 ruptures so that a tear propagates throughout the length of the stress riser 100 along the three corresponding sides 110, 112 and 114 of the deployment door 44. The deployment door 44 is then released for pivotal movement about the hinge 102 from the closed position of FIG. 1 to the opened position of FIG. 2. Since the scrim 76 does not extend across the stress riser 100, it can have tensile and shear strengths that are great enough to withstand stresses that are equal to or greater than those induced in the stress riser 100 by the inflating air bag 14. The scrim 76 thus reinforces the deployment panel 42 so as to help prevent rupturing of the deployment panel 42 beyond the location of the stress riser 100.

A second embodiment of the present invention includes an alternative trim piece 200, as shown partially in FIG. 8. The partial view of the trim piece 200 shown in FIG. 8 corresponds with the partial view of the trim piece 40 shown in FIG. 7. As indicated by the use of the same reference numbers in FIGS. 8 and 7, the trim piece 200 has many parts that are substantially the same as corresponding parts of the trim piece 40. Such parts include a substrate 70, an intermediate layer 72, a cover layer 74, and a scrim 76. The trim piece 200 further has an additional intermediate layer 202 between the substrate 70 and the intermediate layer 72. Like the scrim 76, the additional intermediate layer 202 has a woven structure. However, unlike the scrim 76, the additional intermediate layer 202 extends from the door frame section 90 to the deployment door 44 across both the stress riser 100 and the hinge 102.

Since the additional intermediate layer 202 extends across the stress riser 100, it is formed of woven strands having tensile and shear strengths that are low enough for the strands to be ruptured under the stresses induced in the stress riser 100 by the inflating air bag 14. However, the strands in the additional intermediate layer 202 are strong enough to reinforce the other layers of the deployment panel 42 so as to help prevent fragmentation and/or other rupturing of the deployment panel 42 beyond the location of the stress riser 100. Although the additional intermediate layer 202 may have any suitable woven structure known in the art, it preferably has warp threads that are stronger than the filling threads, with the warp threads extending across the deployment door 44 from the second long side 116 toward the first long side 110 in directions perpendicular to the hinge 102 (FIG. 5).

The present invention has been described with reference to preferred embodiments. From the foregoing description of the invention, those skilled in the art will perceive improvements, changes and modifications. For example, the shapes and sizes of the deployment door panel 42 and/or the deployment door 44 could differ. The stress riser 100 could have a correspondingly different configuration, such as an H-shaped configuration extending along three sides of two adjacent deployment doors. Moreover, a vehicle occupant restraint apparatus may include one or more air bags that inflate upon the occurrence of front, rear, and/or side impacts to the vehicle. The air bags can be mounted in parts of the vehicle other than the instrument panel. Such other parts of the vehicle include, for example, the doors, the pillars, the roof, and the seats. A trim structure constructed in accordance with the present invention could be used with an air bag at any of those locations. Such improvements, changes and modifications within the skill of the art are intended to be covered by the appended claims.

Having described the invention, the following is claimed:

1. Apparatus for use with an inflatable occupant restraint in a vehicle, said apparatus comprising:
    panel means for covering the restraint in the vehicle, said panel means including a deployment door, hinge means for guiding pivotal movement of said deployment door, and a door frame section surrounding said hinge means and said deployment door;
    base means for directing the restraint to move outward toward said deployment door, said base means comprising a wall structure which surrounds said hinge means and said deployment door, said wall structure projecting inward from said door frame section of said panel means; and
    a scrim embedded in said panel means and said base means, said scrim extending partially across said door frame section of said panel means toward said deployment door, extending inward from said door frame section into said wall structure, turning approximately 180° within said wall structure, extending back outward toward said panel means, and extending further from said wall structure to said deployment door through said hinge means.

2. Apparatus as defined in claim 1 wherein said scrim has a woven structure.

3. Apparatus as defined in claim 1 wherein said panel means has layers including a substrate layer and a cover layer which extend across said deployment door and which define inner and outer sides of said deployment door, respectively, said substrate layer and said wall structure being contiguous portions of a continuous piece of substrate material, said scrim being embedded in said piece of substrate material.

4. Apparatus as defined in claim 3 wherein said substrate layer and said cover layer have substantially incompressible structures, said panel means further including an intermediate layer extending across said deployment door between said substrate layer and said cover layer, said intermediate layer having a compressible structure.

5. Apparatus as defined in claim 4 wherein said panel means further includes an additional intermediate layer extending across said deployment door between said intermediate layer and said substrate layer, said additional intermediate layer having a woven structure.

6. Apparatus as defined in claim 5 wherein said panel means defines rupturable boundaries of said deployment door, said additional intermediate layer extending from said door frame section to said deployment door across said rupturable boundaries of said deployment door.

7. Apparatus for use with an inflatable occupant restraint in a vehicle, said apparatus comprising:
    panel means for covering the restraint in the vehicle, said panel means including a deployment door and a door frame section surrounding said deployment door, said panel means having layers including a substantially incompressible substrate layer, a compressible intermediate layer, and a substantially incompressible cover layer, said substrate layer and said cover layer extending across said deployment door and defining inner and outer sides of said deployment door, respectively;
    base means for directing the restraint to move toward said inner side of said deployment door, said base means comprising a wall structure which surrounds said deployment door and which projects inward from said panel means, said wall structure and said substrate layer being contiguous portions of a continuous piece of substrate material; and
    a scrim embedded in said piece of substrate material, said scrim extending continuously from said door frame section of said panel means to said deployment door;
    said scrim extending partially across said door frame section of said panel means toward said deployment door, extending inward from said door frame section into said wall structure, turning approximately 180° back outward toward said panel means, and extending further from said wall structure to said deployment door.

8. Apparatus as defined in claim 7 wherein said scrim has a woven structure.

9. Apparatus for use with an inflatable occupant restraint in a vehicle, said apparatus comprising:
    panel means for covering the restraint in the vehicle, said panel means including a deployment door and a door frame section surrounding said deployment door, said panel means having layers including a substantially incompressible substrate layer, a compressible intermediate layer, and a substantially incompressible cover layer, said substrate layer and said cover layer extending across said deployment door and defining inner and outer sides of said deployment door, respectively;
    base means for directing the restraint to move toward said inner side of said deployment door, said base means comprising a wall structure which surrounds said deployment door and which projects inward from said panel means, said wall structure and said substrate layer being contiguous portions of a continuous piece of substrate material;

a scrim embedded in said piece of substrate material, said scrim extending continuously from said door frame section of said panel means to said deployment door; and a woven intermediate layer extending across said deployment door between said substrate layer and said compressible intermediate layer;

said panel means further defining an elongated hinge extending along a side of said deployment door, said woven intermediate layer having warp threads and filling threads, said warp threads being stronger than said filling threads and extending across said deployment door in directions perpendicular to said hinge.

10. Apparatus for use with an inflatable occupant restraint in a vehicle, said apparatus comprising:

panel means for covering the restraint in the vehicle, said panel means including a deployment door and a door frame section surrounding said deployment door, said panel means having layers including a substantially incompressible substrate layer, a compressible intermediate layer, and a substantially incompressible cover layer, said substrate layer and said cover layer extending across said deployment door and defining inner and outer sides of said deployment door, respectively;

base means for directing the restraint to move toward said inner side of said deployment door, said base means comprising a wall structure which surrounds said deployment door and which projects inward from said panel means, said wall structure and said substrate layer being contiguous portions of a continuous piece of substrate material;

a scrim embedded in said piece of substrate material, said scrim extending continuously from said door frame section of said panel means to said deployment door; and a woven intermediate layer extending across said deployment door between said substrate layer and said compressible intermediate layer.

11. Apparatus as defined in claim 10 wherein said panel means defines rupturable boundaries of said deployment door, said woven intermediate layer extending from said door frame section to said deployment door across said rupturable boundaries of said deployment door.

12. Apparatus as defined in claim 11 wherein said scrim does not extend across said rupturable boundaries of said deployment door.

13. Apparatus as defined in claim 12 wherein said woven intermediate layer is formed of woven strands, said scrim having a woven structure and being formed of stronger woven strands.

14. Apparatus as defined in claim 10 wherein said scrim has a woven structure.

* * * * *